United States Patent

Falkenmayer et al.

[11] Patent Number: 5,785,136
[45] Date of Patent: Jul. 28, 1998

[54] HYBRID DRIVE AND OPERATING METHOD THEREFOR

[75] Inventors: Bernd Falkenmayer, Schwieberdingen; Peter Antony, Lorch, both of Germany

[73] Assignee: Mercedes-Benz AG, Germany

[21] Appl. No.: 616,574

[22] Filed: Mar. 15, 1996

[30] Foreign Application Priority Data

Mar. 29, 1995 [DE] Germany ............... 195 11 516.3

[51] Int. Cl.[6] .................................................. F02B 43/08
[52] U.S. Cl. ..................... 180/65.2; 123/3; 123/DIG. 12
[58] Field of Search ............................. 180/165, 65.1, 180/65.2, 65.3, 65.4; 123/3, DIG. 12, DIG. 13; 290/16, 17, 41, 50

[56] References Cited

U.S. PATENT DOCUMENTS 4,119,862  10/1978  Gocho.
4,722,303   2/1988  Leonhard.

FOREIGN PATENT DOCUMENTS 3501608  7/1986  Germany.
3523855  1/1987  Germany.
4123013  8/1993  Germany.
4331569  3/1994  Germany.
2271018  3/1994  United Kingdom.
PCT/US92/
03106  4/1992  WIPO.

Primary Examiner—Richard M. Camby
Attorney, Agent, or Firm—Evenson, McKeown, Edwards & Lenahan, P.L.L.C.

[57] ABSTRACT

The hybrid drive arrangement according to the invention has a thermal engine that can be operated on a fuel containing hydrocarbons and capable of generating hydrogen. A storage device is provided for the fuel, with an energy storage device for the energy generated by the thermal engine. A drive motor is supplied, depending on the operating state, by the energy from the thermal engine and/or the energy storage device, as well as a method for operation thereof. A hydrogen-generating unit connected to receive fuel from the fuel storage and generates hydrogen from the fuel. The thermal engine is designed for optional operation on the fuel that can be supplied from the storage device or on the hydrogen that is generated. According to the method, the thermal engine is operated in a higher driving load range on the fuel containing the hydrocarbons and on the hydrogen in a lower driving load range, as well as during starting and warmup, at a stationary emission-minimizing operating point, with any remaining power requirement being covered by the energy storage device.

8 Claims, 1 Drawing Sheet

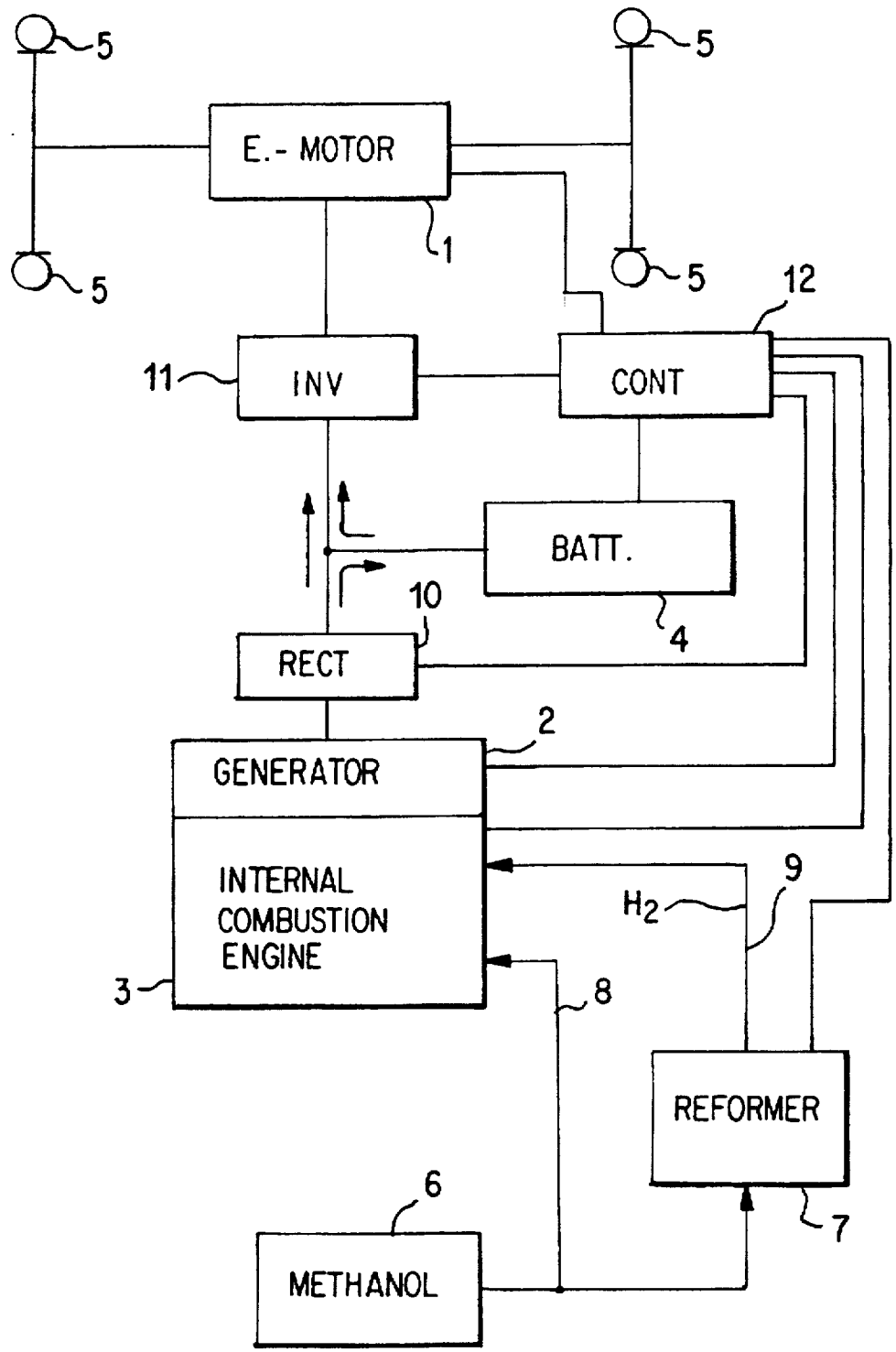

1

HYBRID DRIVE AND OPERATING METHOD THEREFOR

BACKGROUND AND SUMMARY OF THE INVENTION

The invention relates to a hybrid drive arrangement, particularly for use in motor vehicles.

In hybrid drives of this type, the thermal engine is an internal combustion engine which operates on a fuel containing hydrocarbons, if possible at a fixed operating point which is optimum in terms of the specific fuel consumption, with higher power requirements posed under certain conditions being provided by the additional energy storage. The energy storage is recharged during operating phases in which a lower power demand is imposed on the energy generated by the thermal engine. Such hybrid drives in which a generator and an electric drive motor are connected to an internal combustion engine with a traction battery provided in most cases as energy storage device, are described in German patent documents DE 41 33 013 A1 and DE 43 31 569 A1, in International patent document WO 92/18346, and in U.S. Pat. No. 4,119,862. In addition to electrical energy transfer between the thermal engine and the drive motor, hybrid drives with hydraulic energy transfer are also known, such as disclosed, for example in German patent document DE-OS 35 01 608 A1.

German patent document DE-OS 35 23 855 A1 discloses a method for operating a free-breathing or supercharged internal combustion engine, operated primarily with a cracking gas containing primarily hydrogen and carbon monoxide (generated from methanol) and air. The methanol is gasified in a gasification reactor utilizing the exhaust heat given off by the internal combustion engine. In order to eliminate the need for additional heating of the gasification reactor, during starting and warmup the internal combustion engine is supplied directly with the methanol fuel, with the methanol supply being gradually reduced during warmup and the supply of cracking gas gradually being increased accordingly. When a self-igniting internal combustion engine is used, the mixture of cracking gas and air is ignited by injection of an ignitable fuel, such as diesel fuel, under high pressure, is with a separate reservoir being provided for the ignitable fuel. The energy share of the ignitable fuel during normal operation is about 5% to 10%, which can be increased if the exhaust heat from the internal combustion engine is no longer sufficient for complete methanol cracking.

One object of the invention is to provide an efficient hybrid drive arrangement, which has minimum exhaust emissions, and can be operated with the thermal engine activated and with low emissions, during low and medium driving force requirements and, if necessary, is also able to deliver higher driving power.

This problem is solved by the hybrid drive according to the invention, in which the thermal engine can optionally be operated directly with the fuel containing hydrocarbons or with hydrogen (the latter constitutes permitting especially low-emission operation of the thermal engine). The hydrogen is generated by a hydrogen generating unit, from stored hydrocarbon containing fuel, so that no hydrogen storage is required, which is especially advantageous for use in motor vehicles. Because energy from the thermal engine can be stored, if needed, in the energy storage device to supply the drive motor, a drive system is obtained that can be adjusted very well to the existing driving load with minimal emissions. The operating method according to the invention, which is favorable in this regard, provides for operating the thermal engine in a high power range using the fuel containing the hydrocarbons directly, but using the generated hydrogen in the lower driving load ranges with optimally low emissions. If the energy generated by the thermal engine operating at this fixed operating point is insufficient in this lower driving load range, additional energy is drawn from the energy storage. Therefore, the reforming unit need not be designed to reach very high hydrogen production rates and consequently can be made sufficiently small to be well suited for mobile applications as well. The energy storage is recharged during operating phases in which there is a very low power requirement. As is conventional in hybrid drives, especially with low driving load requirements, the thermal engine can be shut off, and the drive motor powered by the energy storage alone, for example for emission-free operation of a motor vehicle in urban areas.

Another particular advantage of the system according to the invention is that the starting and warmup processes, which are primarily responsible for emissions in conventional drives, can be performed with hydrogen. The following procedure is provided for this purpose:

The vehicle commences operation purely electrically, powered by the traction battery. The reformer is activated by a fossil-fuel supplementary burner that uses the fuel in the tank or energy from the traction battery. When it is ready to run and can generate hydrogen, the internal combustion engine is started and allowed to warm up using this hydrogen. During warmup, power can be drawn to propel the car. After warmup, all of the modes of operation described above are possible with methanol and/or hydrogen.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic diagram of a hybrid drive for a motor vehicle.

DETAILED DESCRIPTION OF THE DRAWING

In the hybrid drive shown, an electric motor 1 is used to drive a motor vehicle, shown schematically with its four wheels 5. The motor 1 is coupled to drive the two wheels of a driving axle, but alternatively it may drive both axles, or in yet another alternative a plurality of electric motors can be connected in parallel for individual axles or wheels of the motor vehicle.

The electric drive motor 1 is connected electrically with a traction battery 4 and with a generator 2, which in turn is coupled mechanically to an internal combustion engine 3. Traction battery 4 is also connected to generator 2 so that electrical energy, as indicated by the arrows, can be transferred from generator 2 to electric motor 1 and to traction battery 4, and from traction battery 4 to electric motor 1.

To transfer and convert the electrical energy, a rectifier 10 is connected downstream from generator 2, an invertor is connected upstream from electric drive motor 1, and an electrical control device 12, controls the invertor and other system components. All of the components shown in the FIGURE are of conventional design that can be suitably created without difficulty by an individual skilled in the art depending on the application. For this reason they are not shown in greater detail.

Internal combustion engine 3 is operated alternatively with methanol or with hydrogen $H_2$ as fuels, which can be supplied to it through separate feed lines 8, 9. The methanol is stored in liquid form in an associated methanol tank 6 of the motor vehicle. A reformer unit 7 is provided to generate hydrogen gas; it is supplied at its input with methanol from supply tank 6 and subjects it to a conventional reforming reaction, generating a gas mixture containing hydrogen, from which the hydrogen can be selectively separated by conventional methods. The hydrogen gas obtained in this fashion is then fed from reformer unit 7 into the appropriate supply line 9 for engine 3.

As an alternative to the separate methanol supply shown, a valve may be provided to connect the methanol line 8, which bypasses reformer unit 7, with the hydrogen line that leads from reformer unit 7, so as to provide engine 3 with only one supply from this valve. By controlling this valve, it is possible to switch between methanol injection and hydrogen supply. In the separate supply lines 8, 9 as shown, this switch is performed by controlling valves that are in these lines but are not shown.

The hybrid drive with this design permits the following advantageous method of driving the motor vehicle. During operation requiring high power, (i.e., in a high driving load range), internal combustion engine 3 is operated directly on methanol, so that it is able to generate the high power required. The mechanical energy supplied by engine 3 is converted by generator 2 into electrical energy, and fed to electric drive motor 1 by means of the rectifier 10, inverter 11 and control 12. Additional electrical energy can be supplied from traction battery 4 to electric drive motor 1, if required.

In the lower driving load range and during starting and warmup, engine 3 is operated on hydrogen gas which the reformer unit 7 produces from the methanol fuel. During this hydrogen gas operation, engine 3 is operated at an optimum operating point that minimizes emissions. If higher driving power is required during this operation, which is, however, less than that which necessitates methanol-powered operation of engine 3, but is higher than the power generated by the latter at the fixed hydrogen-fed operating point, traction battery 4 makes up the remaining power requirement. In operating states with a lower driving power requirement, traction battery 4 is charged with the surplus energy from engine 3, which is not required to drive the vehicle.

In addition, when necessary, the drive motor can also be powered in an emission-free operating phase by the traction battery alone, with the engine shut off. It is understood that the various functions described are controlled by a suitable hybrid drive control 12 which in addition to the control functions known from conventional hybrid drives, also controls the fuel supply for internal combustion engine 3 as well as reforming unit 7 in a suitable fashion. In practice, this control can be integrated into a regulating device by which the operating mode of engine 3 and the functions of the other driving components are regulated as a function of the driving power required.

Consequently, with the hybrid drive shown, a vehicle drive is obtained which is optimized with regard to emissions, and which can be adapted flexibly to a variety of drive power requirements. It is understood that instead of methanol, other fuels containing hydrocarbons can be used to fuel the engine 3 from which fuel hydrogen can be split off, for example ethanol or another alcohol. Depending on the fuel used, the hydrogen generating unit is selected accordingly to generate the desired hydrogen gas. As the thermal engine, in addition to a normal piston engine, a free-piston engine or a Sterling engine could be used for example. Instead of the electrical energy transmission system between the thermal engine and the drive motor, a hydraulic or pneumatic system may be used, with the drive motor then being in the form of a hydraulic or pneumatic motor. In addition to the traction battery mentioned above, of course, other conventional electric or other storage media are also suitable as the energy storage, for example a flywheel storage device that stores mechanical energy.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hybrid drive for a motor vehicle, of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein:

a hydrogen-generating unit is connected to receive fuel from the fuel storage tank, and generates hydrogen therefrom;

the thermal engine can be operated alternatively on hydrogen generated by said hydrogen-generating unit; and the thermal engine is configured for optional operation on fuel from said storage tank when said vehicle is in a higher driving load range, and for operation on hydrogen generated by said hydrogen-generating unit when said vehicle is in a lower driving range.

2. Method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein:

a hydrogen-generating unit is connected to receive fuel from the fuel storage tank, and generates hydrogen therefrom; and the thermal engine is configured for optional operation on fuel from said storage tank or on hydrogen generated by said hydrogen-generating unit, said method comprising the steps of;

in a higher driving load range, operating the thermal engine on fuel from the fuel tank; and in a lower driving load range, and during starting and warmup, operating the thermal engine on hydrogen generated by said hydrogen-generating unit, said engine being held at a low-emission operating point; whereby during operating phases in which the thermal engine is operated on hydrogen, and a required driving power exceeds power generated by the thermal engine operated at the fixed operating point, an excess power requirement is supplied from said energy storage.

3. In a hybrid drive arrangement for a motor vehicle, the combination comprising:

a combustion engine which can be operated on hydrogen and on a hydrocarbon containing fuel from which hydrogen can be generated;

a fuel tank for storing hydrocarbon containing fuel from which hydrogen can be generated;

storage means for storing energy from said combustion engine;

a traction motor for driving said vehicle, said traction motor being coupled to receive energy from said combustion engine and from said storage means;

reforming means for generating hydrogen from said fuel stored in said fuel tank; and means for selectively providing either hydrogen from said reforming means or fuel from said fuel tank to operate said combustion engine;

wherein the combustion engine is configured for optional operation on fuel from said storage tank when said vehicle is in a higher driving load range, and for operation on hydrogen generated by said hydrogen-generating unit when said vehicle is in a lower driving range.

4. Combination according to claim 3 further comprising:

means for controlling said hybrid drive arrangement to operate said combustion engine on said hydrocarbon containing fuel from said fuel tank during periods of higher output power requirements and on hydrogen from said reforming means during periods of lower output requirements, and during starting and warmup periods for said combustion engine.

5. Combination according to claim 4 wherein said means for controlling includes means for discontinuing operation of said combustion engine and operating said traction motor solely on energy from staid storage means.

6. Combination according to claim 3 further comprising:

means, operative when said combustion engine is operated on hydrogen and a required driving power exceeds power generated by said combustion engine, for causing said storage means to provide energy to said traction motor.

7. Method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein:

a hydrogen-generating unit is connected to receive fuel from the fuel storage tank, and generates hydrogen therefrom; and the thermal engine is configured for optional operation on fuel from said storage tank or on hydrogen generated by said hydrogen-generating unit, said method comprising the steps of:

in a higher driving load range, operating the thermal engine on fuel from the fuel tank; and in a lower driving load range, operating the thermal engine on hydrogen generated by said hydrogen-generating unit, said engine being held at a low-emission operating point.

8. Method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein:

a hydrogen-generating unit is connected to receive fuel from the fuel storage tank, and generates hydrogen therefrom; and the thermal engine is configured for optional operation on fuel from said storage tank or on hydrogen generated by said hydrogen-generating unit, said method comprising the steps of:

during starting and warmup, operating the thermal engine on hydrogen generated by said hydrogen-generating unit generated, said engine being held at a low-emission operating point; and thereafter, alternatively operating the thermal engine on fuel from the storage tank and hydrogen generated by the hydrogen generating unit.

* * * * *